May 12, 1936. F. HACKL 2,040,087
MILK CAN HOLDER AND DISPENSER
Filed Dec. 18, 1934 2 Sheets-Sheet 2
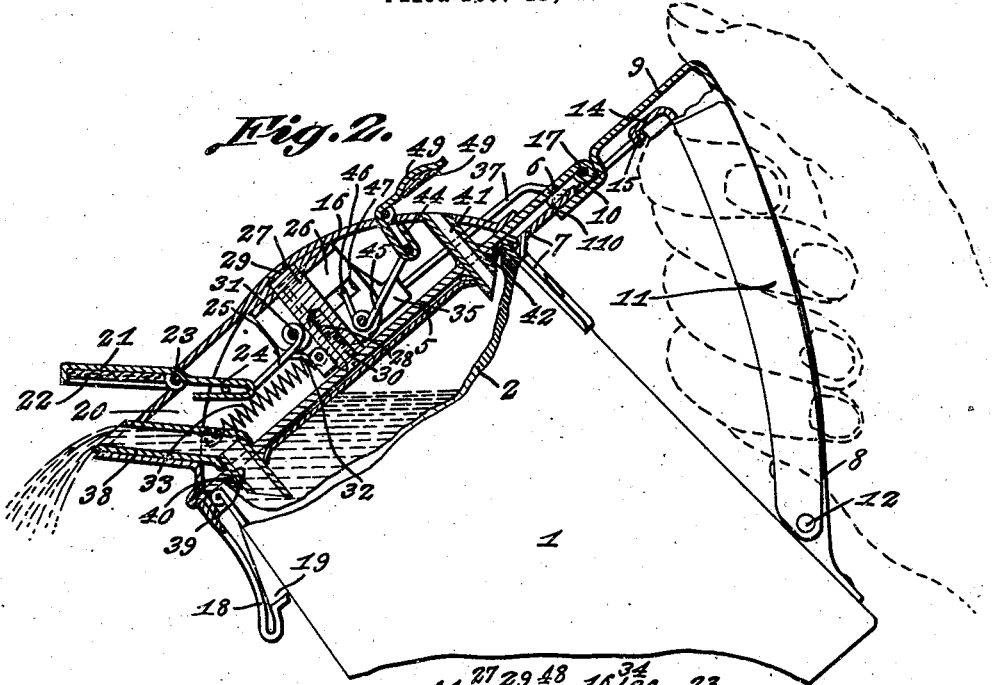
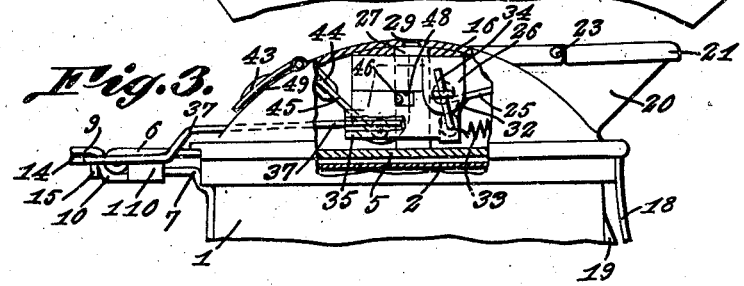
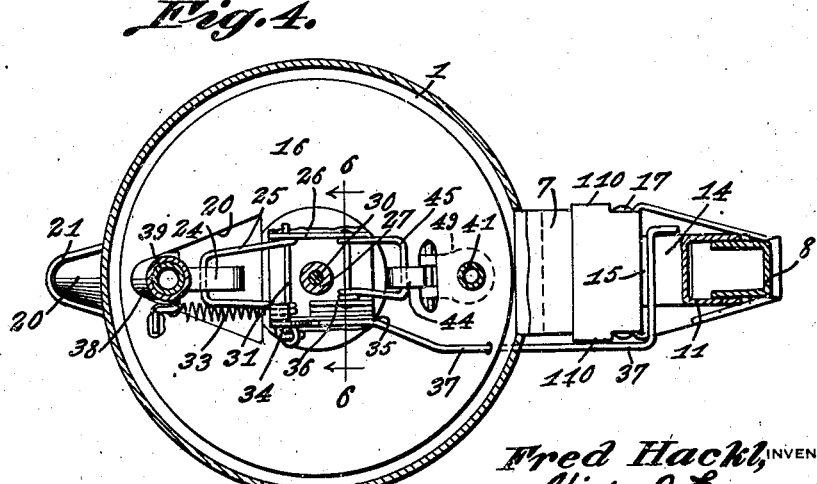
Fred Hackl, INVENTOR
BY Victor J. Evans & Co.
ATTORNEY Patented May 12, 1936

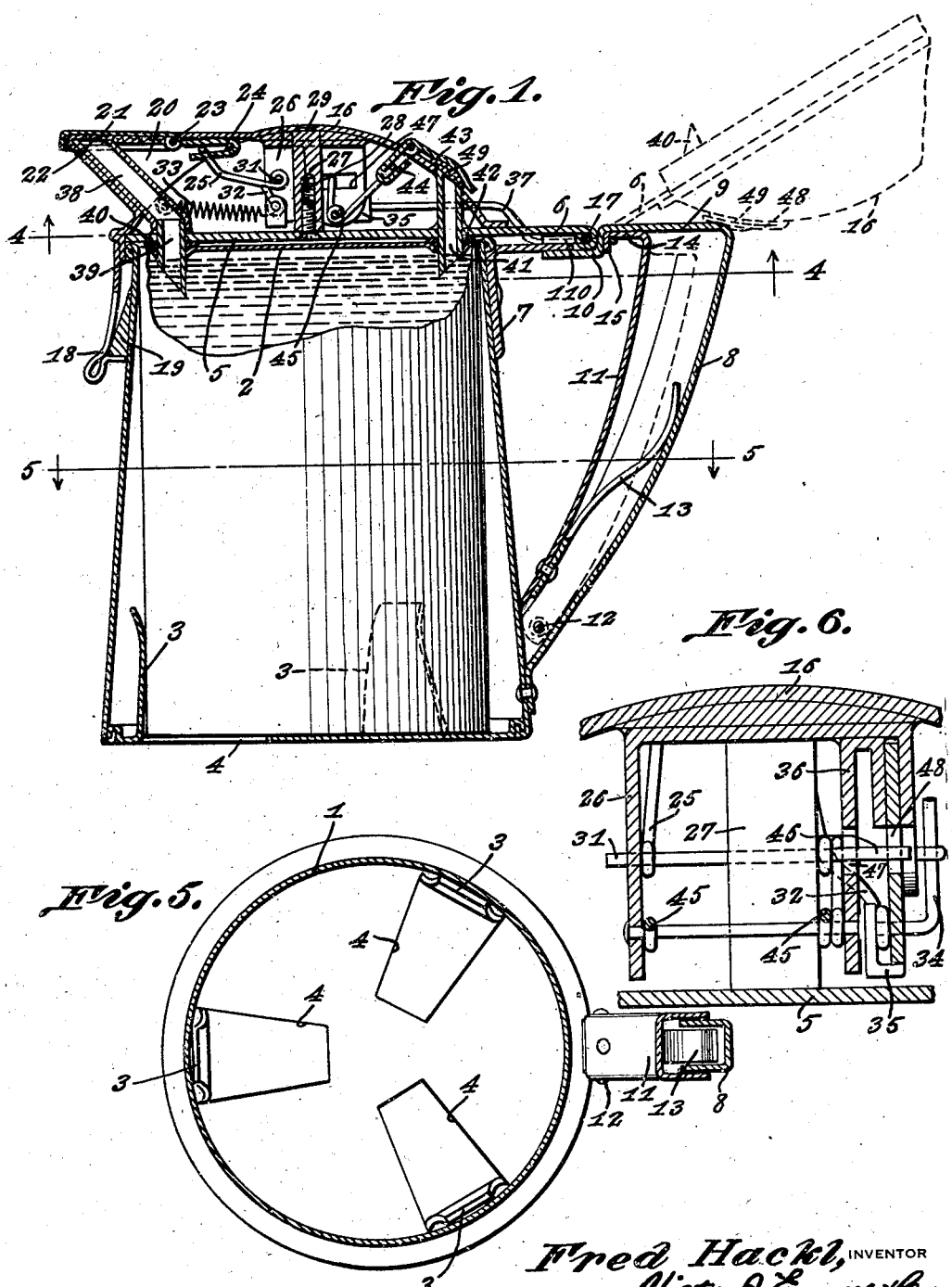

2,040,087

UNITED STATES PATENT OFFICE 2,040,087

MILK CAN HOLDER AND DISPENSER

Fred Hackl, New Kensington, Pa.

Application December 18, 1934, Serial No. 758,109

3 Claims. (Cl. 65—61)

This invention is a holder for food containers, more especially cans containing condensed milk or cream, and the object is to provide means whereby the food product will be maintained in a fresh and sanitary condition and may be poured when desired. It is also an object to provide a device for the stated purpose which may be easily manipulated and will be efficient at all times. Other objects will appear in the course of the following description, and the invention consists in certain novel features which will be particularly defined in the appended claims.

In the accompanying drawings:

Figure 1 is a vertical section through a container embodying the invention.

Figure 2 is a similar view, showing the container in the act of pouring.

Figure 3 is an elevation of the top, partly broken away and in section.

Figure 4 is a section on the line 4—4 of Figure 1.

Figure 5 is a section on the line 5—5 of Figure 1.

Figure 6 is an enlarged detail section on the line 6—6 of Figure 4.

The container or holder comprises a body 1 adapted to completely enclose a can 2 and preferably tapering upwardly, as clearly shown in Figure 1, so that it has a general resemblance to a conventional coffee pot. Tongues 3 are struck up from the bottom of the body to engage the side of the can and hold it firmly, the openings 4 thus produced affording access for the fingers or a suitable pusher to eject an empty can far enough to permit it to be grasped at the top of the container for withdrawal.

The top or cover for the container includes a plate 5 adapted to rest on and extend over the entire area of the upper end of the container, and having a lug or projection 6 at one point for pivotal connection with a bracket 7 secured on the body at the upper end of the same. A handle is secured to the side of the body, at or near the lower end thereof, and includes a bar 8 U-shaped in cross section and diverging upwardly from the body along a curve which is comfortable to the hand of the user. At the upper end of this handle member, its central or outer web is bent toward the body, as at 9, to extend over the upper end of the handle and be secured to the bracket, the extremity of the extension turning down past the end of the bracket and then projecting under the bracket, as at 10, to be intimately united therewith by soldering or otherwise. Relative lateral movement of the projection 10 is prevented by lugs 110 on the edges of the projection extending up past the edges of the bracket. Between the member 8 and the body of the container is a second handle member 11, also U-shaped in cross section, fitted over the member 8 and pivoted thereto at 12 adjacent its lower end. A leaf spring 13 is secured to the member 11 and extends upward with its free end bearing upon the outer member, as shown in Figure 1 whereby the members are normally held in spread apart relation but may be pressed together, as shown in Figure 2 to operate closures as will presently fully appear. At the upper extremity of the handle member 11 is a tongue 14 abutting the under side of the extension 9 and slidable thereon, said tongue terminating in a downturned lip 15.

The plate 5 constitutes the base of a dome-like top, the upper portion of which is furnished by a plate 16 having the contour of a segment of a sphere and its edge united by soldering or otherwise with the base plate 5, and diametrically opposite the pivot or hinge 17 the top plate carries a latch 18 adapted to engage under a lug 19 on the body 1 to hold the top closed. A pouring spout 20 is formed on the top plate and a hinged cover 21 normally extends over said spout, a lining 22 of cork or other light cushioning material being provided to seal the joint between the spout and the cover and avoid evaporation. At the hinge 23, the cover is provided with a slotted crank 24 which projects into the inner space of the domed top and is engaged by a bail or lever 25 which is pivoted within a yoke or bracket 26, said yoke being inverted and secured firmly to the top plate 16 at the center thereof and the structure being further reenforced by a post 27 having a threaded socket 28 in its lower end and having a stud 29 on its upper end upset in the top plate 16. A screw 30, inserted upwardly through the base plate 5, engages in the socket 28 and maintains the relation of the parts.

The ends of the bail or lever 25 are formed with eyes through which a pin 31 is inserted to pivotally mount the lever in the inverted yoke or frame 26, and a crank arm 32 extends down from one side of the bail 25, said crank arm 32 having a terminal eye in which is engaged one end of a retractile spring 33 the opposite end of which is anchored in any convenient manner adjacent the spout. A pin 34, secured in one side of the frame 26, is engaged in an eye on one end of the pin 31 to prevent the pin slipping out of place. The end of the crank arm 32 is pivoted to a slide 35 mounted between a side of the frame 26 and an inner partition 36 therein, and a pull-rod 37 passes through an opening in the top plate 16 and has its inner end secured to the slide, the pull-rod being disposed at one side of the bracket 7 and the extension 10 and having its outer free end bent laterally and engaged behind the lip 15 of the movable handle member. When the lid 21 is in closed position, it covers the end of an outlet tube 38 which is secured in the spout 20 and has its inner end fitted snugly to the upper end of a tube 39 which is passed through and firmly secured in the base plate. The lower end of the tube 39 is tapered to a sharp point and the tube is preferably of metal so that it may puncture the top of the can, a gasket 40 being mounted on the tube to seal the puncture.

At a point diametrically opposite the spout, a tube 41 similar to but of less diameter than the tube 39, is secured in the plates 5 and 16, a gasket 42 being mounted on said tube to seal the puncture made thereby in the can top. A cover 43 is hinged upon the top plate 16 to extend over the open upper end of the tube 41 and a slotted crank 44 extends from the hinged end of said cover within the dome top. The crank 44 is engaged by one arm of an angle lever or bail 45 which is pivoted upon the frame 26 and has the extremity 46 of its other arm inserted through a slot 47 in the side of the frame 26 to engage an opening 48 in the slide 35 whereby the angle lever will be caused to rock with the movements of the slide. The cover 43, like the cover 21, has a cork lining 49.

The construction and arrangement of the several parts of the device having been thus made known, it is thought the operation will be readily understood. When the handle is not gripped, the covers 21 and 43 will be in closed position and the handle members will be in spread relation, as shown in Figure 1. When a can is to be inserted, the top is swung over to rest upon the handle, as shown in Figure 1 by dotted lines, thereby exposing the interior of the container. The can is then inserted to rest on the bottom of the container and be held by the tongues 3. The top is then returned to position over the container and the pointed end of the tube 41 will be thereby brought into contact with the top of the can. Pressure is applied to the top of the container to force the tube 41 through the can top and then bring the tube 39 onto and through the can top. The device is now ready for pouring which is accomplished by gripping the handle and tilting the body, as shown in Figure 2. When the handle is gripped, the member 11 is pressed to the member 8 and a pull is consequently exerted upon the rod 37 which is transmitted through the slide 35 to the levers 25 and 45 so that the levers will be rocked and the covers 21 and 43 swung into open position, the spring 33 being placed under tension. The contents of the can may then be poured through the tubes 39, 38 as will be understood, air entering through the tube 41 as the milk or other food product discharges through the tube 39. When the grip upon the handle is released, the spring 33 at once returns the parts to initial position, the covers seating closely over the respective tubes to protect the contents of the can against contamination and evaporation.

Having described my invention, what I claim is:

1. A container of the type described comprising a body, a handle member secured on the body, a second handle member pivoted to the first member and yieldably held in spread relation thereto, a top for the body, a pouring tube in the top, an air-inlet tube in the top, covers on the top for the tubes, a pull-rod engaged with the pivoted handle member, and operative connections between the pull-rod and the covers whereby to simultaneously open or close the covers.

2. A container of the type described comprising a body, a top to close the body, a pouring tube in the top, an air-inlet tube in the top, covers for said tubes hinged on the top, cranks extending from the covers within the top, levers mounted in the top and engaged with said cranks, a slide on the top connected to the levers and a pull rod connected to the slide for rocking said levers whereby to simultaneously open or close said covers.

3. A container of the type described comprising a body, a top to close the body, a pouring tube in the top, an air-inlet tube in the top, covers for said tubes mounted on the top, yieldable means in the top for holding the covers closed, a slide mounted in the top, lever connections between the slide and the covers, and a pull-rod secured to the slide and extending to the exterior of the top.

FRED HACKL.